United States Patent [19]

Howard et al.

[11] Patent Number: 4,471,405

[45] Date of Patent: Sep. 11, 1984

[54] THIN FILM CAPACITOR WITH A DUAL BOTTOM ELECTRODE STRUCTURE

[75] Inventors: James K. Howard, Fishkill; Kris V. Srikrishnan, Wappingers Falls, both of N.Y.

[73] Assignee: International Business Machines Corporation, Armonk, N.Y.

[21] Appl. No.: 538,618

[22] Filed: Oct. 3, 1983

Related U.S. Application Data

[62] Division of Ser. No. 335,136, Dec. 28, 1981, Pat. No. 4,423,087.

[51] Int. Cl.³ .................. H01G 1/01; H01L 29/78; B05D 5/12
[52] U.S. Cl. ............................... 361/305; 357/23; 427/79
[58] Field of Search ............ 361/305, 322; 204/15, 204/192; 427/79, 88, 89, 91; 357/23 TF, 71; 29/25, 42; 339/278 C

[56] References Cited

U.S. PATENT DOCUMENTS

| | | | |
|---|---|---|---|
| 3,106,489 | 10/1963 | Lepselter | 427/91 X |
| 3,320,500 | 5/1967 | Axelrod et al. | 361/305 |
| 3,394,290 | 7/1968 | Boykin | 427/79 X |
| 3,621,347 | 11/1971 | VanNielsen | 357/23 |
| 3,723,838 | 3/1973 | Kumagai | 361/322 |
| 3,969,197 | 7/1976 | Tolar et al. | 204/15 |
| 4,002,545 | 1/1977 | Fehiner et al. | 204/192 |

FOREIGN PATENT DOCUMENTS

| | | | |
|---|---|---|---|
| 54-72452 | 6/1979 | Japan | 339/278 C |

*Primary Examiner*—Donald A. Griffin
*Attorney, Agent, or Firm*—Douglas A. Lashmit; Mitchell S. Bigel

[57] ABSTRACT

A thin film capacitor having a dual bottom electrode is provided. The bottom electrode includes a first layer of metal and a second layer of platinum, the metal of the first layer having the characteristic of forming a stable intermetallic phase with platinum during heat treatment. The first layer metal may be selected from the group consisting of Hf, Zr and Ta. The thin film capacitor may be employed as a decoupling capacitor in VLSI devices.

9 Claims, 6 Drawing Figures

THIN FILM CAPACITOR WITH A DUAL BOTTOM ELECTRODE STRUCTURE

This is a division of application Ser. No. 335,136 filed Dec. 28, 1981 and now U.S. Pat. No. 4,423,087 issued Dec. 27, 1983.

TECHNICAL FIELD

This invention relates to thin film capacitors and particularly to decoupling capacitors for each integrated circuit chip to remove undesirable noise. More particularly, this invention relates to the bottom electrode structure for thin film capacitors.

BACKGROUND ART

The prior art, U.S. Pat. No. 4,002,545 entitled "Method of Forming A Thin Film Capacitor" granted Jan. 11, 1977 to F. P. Fehiner et al., proposed a thin film capacitor comprising a dual bottom electrode, a tantalum oxide film formed on the bottom electrode, and a counter electrode. The duplex bottom electrode consists of a first layer of any electrically conductive material which is compatible with tantalum and tantalum oxide, such as aluminum, nichrome, chromium, and gold, and a second layer of tantalum.

U.S. Pat. No. 3,969,197 entitled "Method For Fabricating A Thin Film Capacitor" granted July 13, 1976 to N. J. Tolar et al., discloses a thin film capacitor having a dual bottom electrode which consists of a first layer of molybdenum or tungsten and a second layer of chromium, on which is deposited a dielectric film of tantalum oxide. The materials used are selected so that they all have substantially the same coefficient of thermal expansion. These dual bottom electrodes of the prior art are not satisfactory for use in the VLSI devices, particularly when they are used for decoupling capacitors since they are subject to corrosion or oxidation during high temperature deposition of CVD $Si_3N_4$ or $SiO_2$.

U.S. patent application Ser. No. 487,786 entitled "Capacitor Structures With Dual Dielectrics" by J. K. Howard, filed Apr. 22, 1983, which is a continuation of Ser. No. 182,740, filed Aug. 29, 1980 (now abandoned), and assigned to the assignee of this invention relates to a thin film capacitor wherein the dielectric film is comprised of a first dielectric layer of silicon nitride or aluminum oxide and a second dielectric layer selected from the group consisting of $Ta_2O_5$, $HfO_2$, $TiO_2$, $PbTiO_3$, $BaTiO_3$, $CaTiO_3$, and $SrTiO_3$. The bottom electrode was polycrystalline silicon which could easily withstand the 800° C. process for CVD $Si_3N_4$. However, if this capacitor structure is used for a thin film decoupling capacitor, polysilicon is not acceptable since the sheet resistance of phosphorus doped polysilicon is approximately 20-40 ohms/square, whereas the sheet resistance requirement for the bottom electrode in the decoupling capacitor is $10-30\times10^{-2}$ ohms per square.

U.S. Pat. No. 3,723,838 entitled "Nitrogen-Doped Beta Tantalum Capacitor" granted Mar. 27, 1973 to H. Y. Kumagai and U.S. Pat. No. 3,621,347 entitled "Semiconductor Device Comprising A Field Effect Transistor Having An Insulated Gate Electrode and Circuit Arrangement Comprising Such a Semiconductor Device" granted Nov. 16, 1971 to J. A. Van Nielen generally relate to thin film capacitors.

DISCLOSURE OF INVENTION

Since large scale integrated circuit devices operate on a very high frequency such as 1 GHZ, the capacitor properties must be stable. The dissipation factor, tan S, is frequency dependent:

$$\tan S = \tan S' + WCR$$

where
tan S' = intrinsic loss due to dielectric
C = proportionality constant
W = frequency
R = series resistance of electrodes + leads Thus, to achieve a stable and low dissipation factor at high frequency, it is important that the resistivity of the electrodes be low to minimize series resistance.

It is also important that the bottom electrode structure is thermally stable so that it can be used as the substrate for high temperature deposition of dielectrics. The bottom electrode is required to have the properties of providing a smooth metallic surface to reduce pin hole type defects, providing an oxidation resistant surface at high temperature, and providing good adhesion to the underlaying substrate.

Therefore, it is the object of this invention to provide a thin film capacitor which is stable at high frequencies.

It is another object of the invention to provide a thin film capacitor having a low dissipation factor.

It is a further object of the invention to provide a thin film capacitor having a bottom electrode which has low resistivity and is stable to high temperature treatment.

It is a still further object of the invention to provide a process for forming a thin film capacitor having a bottom electrode which has low resistivity and is stable to high temperature treatment.

According to the invention, the thin film capacitor includes a bottom electrode of dual structure which comprises a first layer of metal which, when subjected to a high temperature anneal, interdiffuses into a platinum layer to form a very stable intermetallic phase having lower resistivity than platinum, and a second layer of platinum. Because of the very stable intermetallic phase, the growth of such phase is self-limiting and the first layer metal does not reach the surface of the platinum layer during heat treatment. The metal for the first layer is typically selected from the group consisting of zirconium, hafnium and tantalum. When the dual bottom electrode is subjected to the high temperature (500°-1000° C.) anneal, Pt and Zr, Hf or Ta interdiffuse to form a very stable intermetallic phase $ZrPt_3$, $HfPt_3$, or $TaPt_3$. The resistivity of these phases is approximately 8μ ohm cm, which is less than that of Pt, 10.6μ ohm cm. Some properties of these phases are included in a publication by L. M. Pecora and P. J. Ficalora (Journal of Electronic Material 6, 531 1977). When the capacitor of this invention is formed on a silicon dioxide layer on a semiconductor body, the first metal layer reduces the thickness of the $SiO_2$ at the interface to form an adhesive bond to the substrate during heat treatment. This is because the metal of the first layer forms more stable oxides than $SiO_2$ and oxygen is displaced from $SiO_2$ to form a metal oxide of the first layer such as $ZrOx$, $TaOx$ and $HfOx$.

The dielectric layer for the capacitor of this invention can be any conventional material like $Ta_2O_5$. However, for high density capacitance applications, the dual dielectric layer as proposed in U.S. patent application Ser.

No. 487,786 is appropriate. The dual dielectric layer comprises a first dielectric layer of silicon nitride or aluminum oxide, or silicon dioxide formed on the bottom electrode, and a second dielectric layer selected from the group consisting of $Ta_2O_5$, $HfO_2$, $TiO_2$, $PbTiO_3$, $BaTiO_3$, $CaTiO_3$ and $SrTiO_3$. Typically, the dual dielectric layer is composed of a thin CVD $Si_3N_4$ layer deposited at 800° C. onto the bottom electrode material and reactively sputtered $Ta_2O_5$ deposited onto the $Si_3N_4$. The dielectric constant of $Ta_2O_5$ is high ($\epsilon \sim 22\text{-}25$) and provides high capacitance and the $Si_3N_4$ layer or $SiO_2$ layer exhibits a high breakdown field ($\sim 10$ MV/cm), thus providing low leakage ($\sim 10^{-12}$A at 2 V) and high breakdown voltage. A particular capacitor requirement can be achieved by varying the oxide/nitride thickness ratio using the equation for capacitors in series.

The counter electrode for the capacitor of the invention can be any conductive material such as Al, Cu, Al-Cu, etc.

BRIEF DESCRIPTION OF THE DRAWINGS

The details of this invention will be described in connection with the accompanying drawings, in which.

BEST MODE FOR CARRYING OUT THE INVENTION

Figure 1:
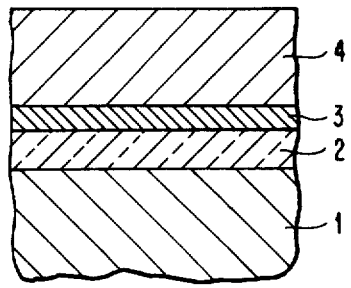
FIG. 1 is a cross-section of the bottom electrode structure.
Figure 2:
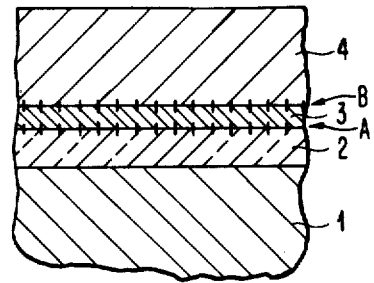
FIG. 2 is a cross-section of the bottom electrode showing interfaces where reactions occur.

A cross-section of the bottom electrode structure is shown in FIG. 1. The silicon wafer 1 having silicon dioxide layer 2 formed thereon is cleaned with 10:1 buffered HF for 10 seconds, $N_2$ blow dried and loaded in a deposition system. In one embodiment, layer 3 of Zr, Hf, or Ta is electron beam evaporated to a thickness of 500-700 Å at 3 Å/sec at a pressure under $2 \times 10^{-6}$ Torr. After layer 3 is deposited, the substrate is transferred to a metal sputtering system where Pt is sputter deposited to form Pt layer 4 of a thickness of 10,000-20,000 Å at 2-5 Å/sec under approximately $10^{-7}$ Torr base pressure with 1 KW 10 m Torr Argon. Upon heat treatment such as for dielectric deposition and/or post deposition anneal, reactions occur at the interface A between $SiO_2$ and layer 3, and at the interface B between layer 3 and layer 4 (FIG. 2).

Figure 4:
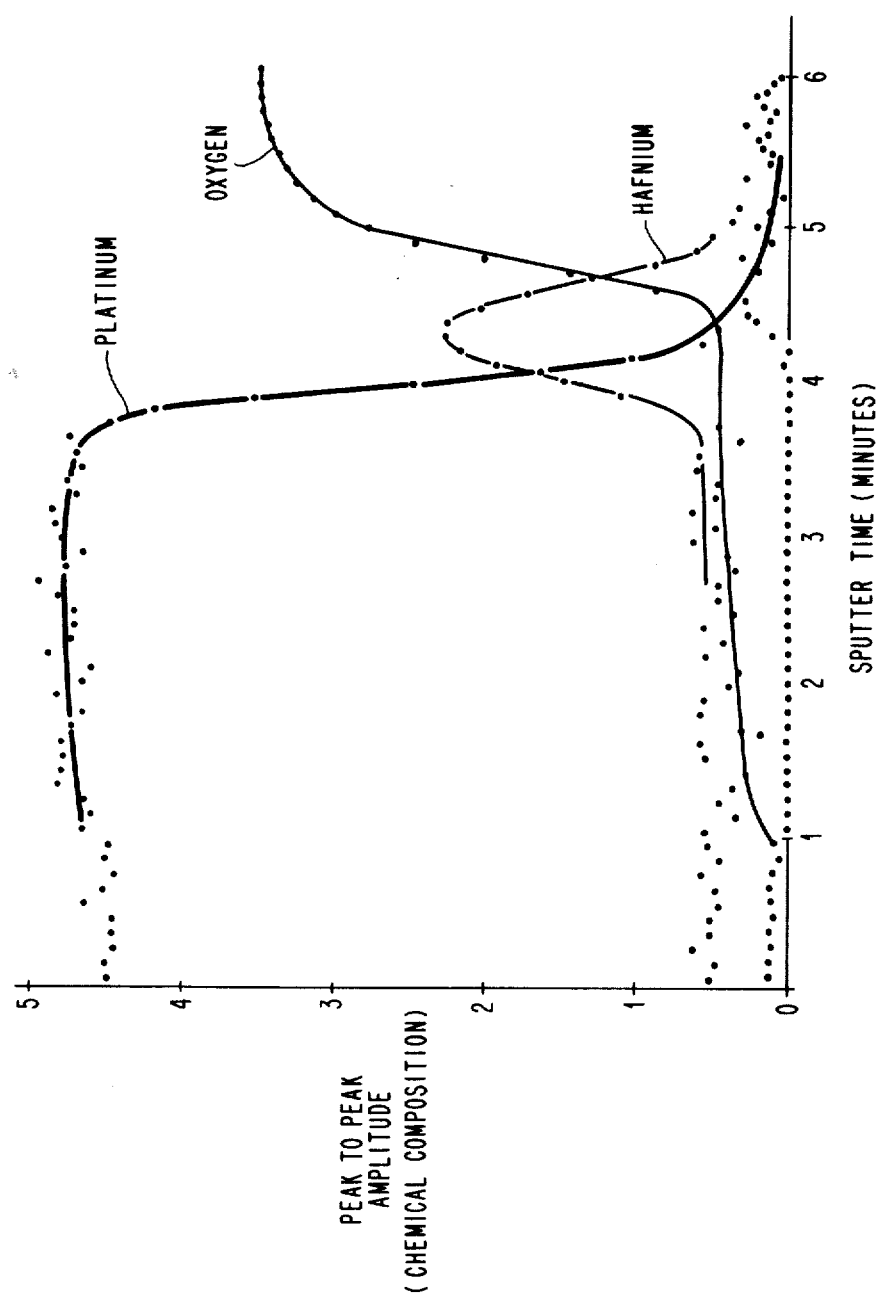
FIG. 4 shows an Auger depth-composition profile for Pt-Hf deposited on oxidized silicon.
Figure 5:
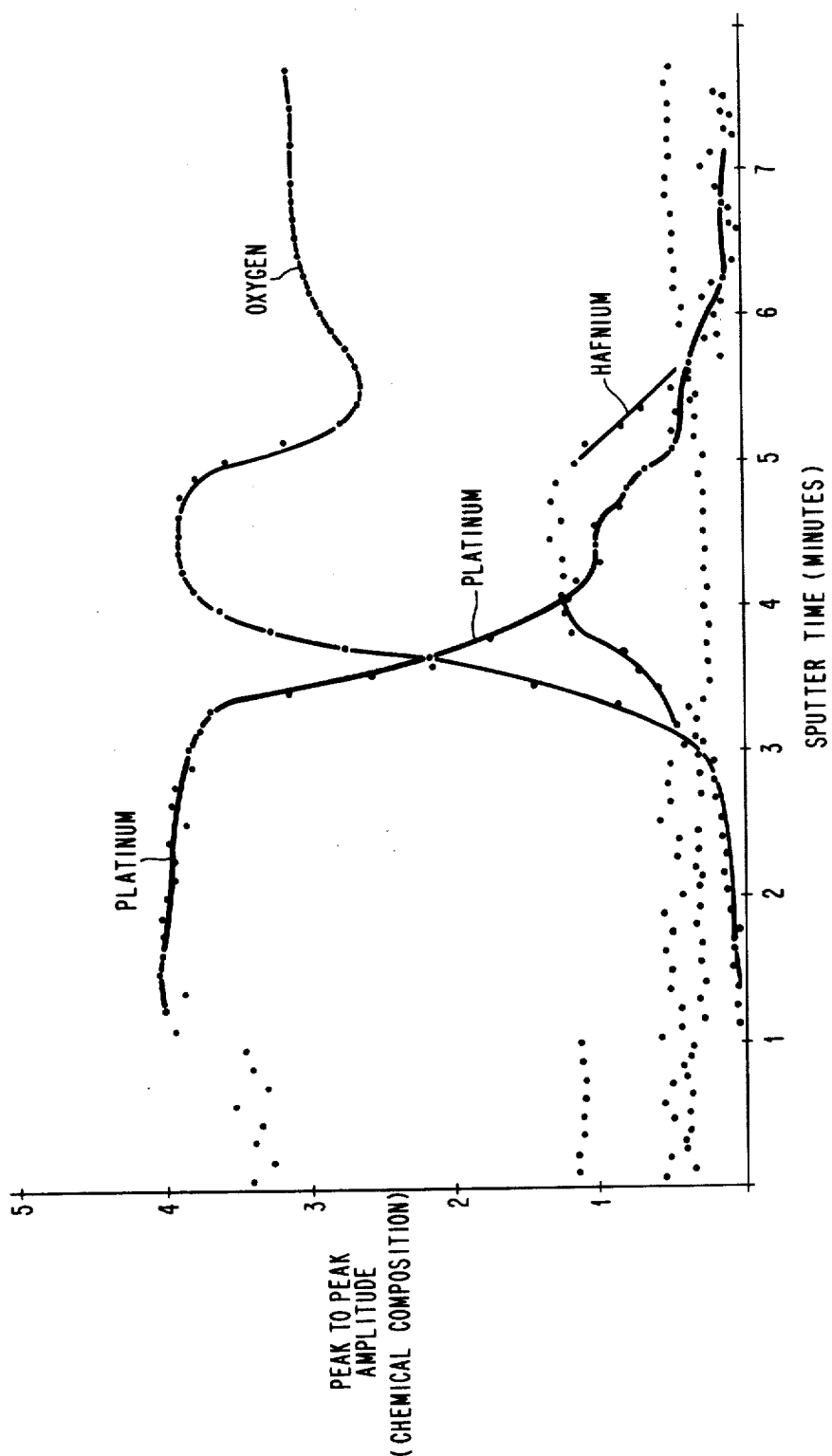
FIG. 5 shows the Auger depth-composition profile after anneal at 800° C. in vacuum.

At interface A, the metal of layer 3, i.e., Zr, Hf or Ta reduces $SiO_2$ to form an adhesive bond to the substrate. During the high temperature anneal, Pt of the second layer and Zr, Hf, or Ta of the first layer interdiffuse at interface B to form a very stable intermetallic phase $ZrPt_3$, $HfPt_3$, or $TaPt_3$. The resistivity of these phases is approximately $8\mu$ ohm cm, which is less than $10.6\mu$ ohm cm of Pt. FIG. 4 shows an Auger depth-composition profile for the bottom electrode structure comprising 500 Å Hf layer deposited on $SiO_2$ and 3000 Å Pt deposited on the Hf layer. To simulate CVD $Si_3N_4$ deposition, the bottom electrode structure was annealed at 800° C. FIG. 5 shows the auger depth-composition profile after anneal. Pt-Hf reaction and reduction of $SiO_2$ (dip in oxygen profile) are shown.

The important feature of this profile is that Hf is retained at the interface after anneal and does not reach the Pt surface. It is postulated that $HfPt_3$ forms and limits further diffusion of Hf and/or Hf is stabilized by reduction of $SiO_2$. Surface sensitive Auger profiles were obtained on 10,000 Å Pt on Zr films after 800° C. anneals and Zr was not detected.

The series resistance was measured for a sample having a bottom electrode comprising 3000 Å Pt and underlaying 500 Å Hf deposited on 5000 Å $SiO_2$ formed on N+ silicon substrate. The sheet resistivity $Rs = \rho/t$ measured before anneal was 0.706 ohms/square and after anneal at 800° C. to simulate $Si_3N_4$ it was reduced to 0.592 ohms/square.

The Pt-Hf-$SiO_2$ reaction was evaluated further by Auger electron spectroscopy. A composition-depth profile shown in FIGS. 4 and 5 reveal Pt-Hf-$SiO_2$ system before anneal and after 800° C. anneal. The dip in the oxygen peak represents reduction of $SiO_2$ by Hf to provide excellent adhesion. The Pt peak is altered in Hf and represents $PtHf_x$ compound phase. The phase growth is self-limiting, as it grows thicker it limits further penetration of Hf, thus little Hf penetrates the phase even at 800° C. The resistivity of $HfPt_3$ is known to be very low ($8\mu$ ohm cm) and probably accounts for the drop in the sheet resistivity after heat treatment. The self-limiting nature of the Hf-Pt phase is expected since these phases are some of the most stable structures.

Three kinds of samples were prepared for comparison. The first sample is composed of a dual bottom electrode consisting of 7000 Å Pt layer and underlaying 500 Å Hf layer which is deposited on 5000 Å $SiO_2$ layer formed on a silicon substrate. The second sample includes a dual bottom electrode consisting of 7000 Å Pt layer and underlaying 500 Å Zr layer which is deposited on 5000 Å $SiO_2$ layer on a silicon substrate. The dual (i.e. composite) bottom electrode of the third sample comprises 7000 Å Pt layer and underlaying 500 Å Cr layer which is deposited on 5000 Å $SiO_2$ layer on a silicon substrate. Table I shows the results of sheet resistivity measurements made before and after 800° C. anneal to simulate CVD $Si_3N_4$ deposition.

TABLE I

|  | $R_s$ (As-Deposited) | $R_s$ (Anneal) | Δ (%) |
| --- | --- | --- | --- |
| Pt/Hf | 275 mΩ/square | 317 mΩ/square | +15% |
| Pt/Zr | 237 mΩ/square | 260 mΩ/square | +9.7% |
| Pt/Cr | 260 mΩ/square | 519 mΩ/square | +99.6% |

The data indicates that the sheet resistivities of Pt/Hf and Pt/Zr electrode structures are much lower than that of Pt/Cr structure after heat treatment. The sheet resistivity increased by 15% and 9.7% with heat treatment as to Pt/Hf and Pt/Zr structures respectively while it increased 99.6% with Pt/Cr structure.

An improved sheet resistivity is obtained by interrupting the deposition process after deposition of Zr, Hf, or Ta, opening the system to air before deposition of Pt. It is postulated that interdiffusion between Pt and underlaying metal is reduced by this interruption. However, the effect of breaking vacuum appears to be slight.

Table II shows the results of sheet resistivity measurements before and after heat treatment.

TABLE II

|  | $R_s$ (As-Deposited) | $R_s$ (Anneal)* | Δ (%) |
| --- | --- | --- | --- |
| Pt/Hf (SPD) | 167 mΩ/square | 213 mΩ/square | 27.5% |
| Pt/Hf (BV) | 172 | 218 | 26.7% |
| Pt/Zr (SPD) | 167 | 205 | 22.7% |
| Pt/Zr (BV) | 166 | 199 | 19.8% |
| Pt/Ti (SPD) | 219 | 337 | 53.8% |

*150 Å $Si_3N_4$ deposited at 800° C. and stripped prior to $R_s$ measurement.

For the samples of Table II, 150 Å $Si_3N_4$ layer is deposited on the dual bottom electrode structure at 800° C. and stripped prior to sheet resistivity measurement. In the Table, SPD indicates the Pt and Hf or Zr were deposited in a single pump down. BV indicates that vacuum was broken and the system was exposed to air prior to Pt deposition.

Thin film capacitor samples having the dual bottom electrode structure which comprises 7500 Å Pt layer and underlaying 600 Å Zr layer were annealed at 1025° C. in Argon. These samples show two times increase after processing at a temperature higher than 1000° C. The sheet resistivity being 0.24 ohm/square before anneal and 0.43 ohm/square after anneal. The Pt/Zr or Pt/Hf electrode structures are stable at deposition temperature higher than about 1000° C. This property could be useful in forming metal gates for FET applications.

Figure 3:
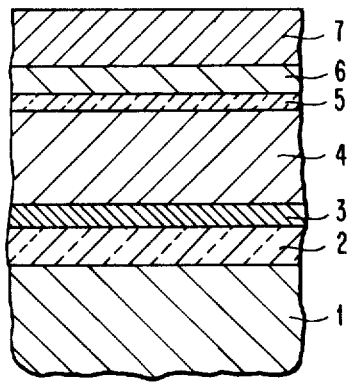
FIG. 3 shows a cross-section of a capacitor device array.

FIG. 3 shows the cross-section of a capacitor device array which has a Pt/Zr bottom electrode. The capacitor area was aproximately $4.13 \times 10^{-2}$ cm$^2$. The capacitor comprises of the dual bottom electrode of Zr layer 3 of 500 Å and Pt layer 4 of 7500 Å, $Si_3N_4$ layer 5 of 173 Å deposited on Pt layer 4. $Ta_2O_5$ layer 6 of 225 Å deposited on layer 5, and a 7000 Å counter electrode 7 of aluminum containing 4% of copper. Approximately one hundred devices were tested prior to $SiO_2$ overlay and mostly yielded the 10 nanofarad capacitance with leakage less than $10^{-10}$–$10^{-11}$ amp. at 3 V.

Figure 6:
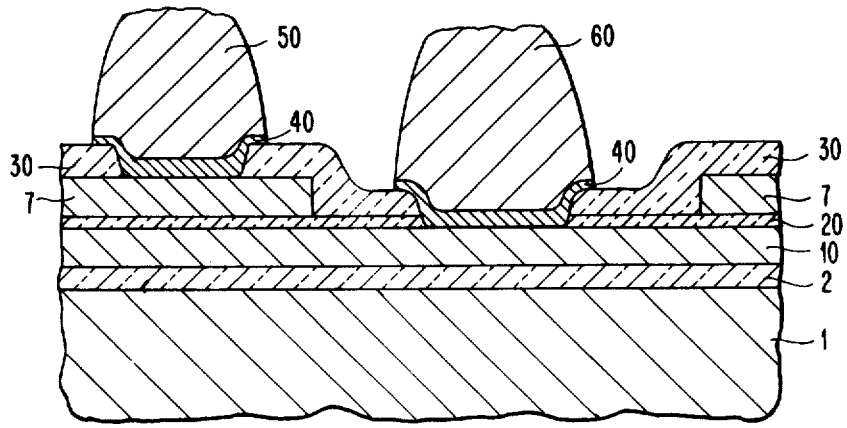
FIG. 6 is a cross-section of a capacitor device array including solder pads for flip-chip bonding.

FIG. 6 shows a cross-section of a semiconductor device which was processed to include solder pads 50 and 60 for flip-chip bonding. A dual bottom electrode 10 is formed on a semiconductor silicon substrate 1 having $SiO_2$ layer 2 formed thereon, followed by deposition of a dielectric layer 20, preferably comprising of a dual layer of $Si_3N_4$ and $Ta_2O_5$. A counter electrode 7 of any conventional conductive material such as Cu, Al, Al-Cu, etc., is deposited and formed into the desired electrode pattern with conventional method. After $SiO_2$ layer 30 is deposited, contact holes are opened through $SiO_2$ layer 30 and dielectric layer 20 with conventional photolithographic and etching technique to expose portions of the bottom electrode 10 and the counter electrode 7. Solder pads 50 and 60 are formed to contact electrode 7 and 10 respectively for flip-chip bonding. The solder pads include Cr-Cu-Au layer 40 at the interface with the underlaying electrodes.

While the invention has been particularly shown and described with reference to the embodiments thereof, it will be understood by those skilled in the art that the foregoing and other changes in form and detail may be made therein without departing from the spirit and scope of the invention.

What is claimed is:

1. A thin film capacitor comprising:
   a dual bottom electrode including a first layer of metal, and a second layer of platinum, said metal of the first layer being of the nature of forming a stable intermetallic phase with platinum during heat treatment,
   a dielectric layer formed on said bottom electrode, and
   a counter electrode formed on said dielectric layer.

2. The thin film capacitor of claim 1 wherein said intermetallic phase has lower resistivity than platinum.

3. The thin film capacitor of claim 2 wherein said metal of the first layer is selected from the group consisting of hafnium, zirconium and tantalum.

4. The thin film capacitor of claim 3 formed on a supporting substrate.

5. The thin capacitor of claim 4 wherein said substrate comprises a dielectric adjacent said bottom electrode.

6. The thin film capacitor of claim 5 wherein said dielectric comprises a silicon dioxide coating on a semiconductor device.

7. A thin film capacitor comprising:
   a dual bottom electrode including a first layer of metal and a second layer of platinum, said first layer metal having the characteristic of forming a stable intermetallic phase with platinum during heat treatment, said intermetallic phase having a lower resistivity than platinum;
   a dual dielectric layer of silicon nitride and tantalum pentoxide formed on said bottom electrode; and
   a counter electrode formed on said dual dielectric layer.

8. The thin film capacitor of claim 7 being formed on a semiconductor integrated circuit substrate.

9. The thin film capacitor of claim 8 being a decoupling capacitor for the integrated circuit.

* * * * *